United States Patent
Yura

(10) Patent No.: US 12,074,309 B2
(45) Date of Patent: Aug. 27, 2024

(54) LITHIUM SECONDARY BATTERY

(71) Applicant: NGK INSULATORS, LTD., Nagoya (JP)

(72) Inventor: Yukinobu Yura, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 268 days.

(21) Appl. No.: 17/199,580

(22) Filed: Mar. 12, 2021

(65) Prior Publication Data

US 2021/0202929 A1 Jul. 1, 2021

Related U.S. Application Data

(63) Continuation of application No. PCT/JP2019/040650, filed on Oct. 16, 2019.

(30) Foreign Application Priority Data

Nov. 1, 2018 (JP) .................. 2018-206455

(51) Int. Cl.
*H01M 4/00* (2006.01)
*H01M 4/131* (2010.01)
(Continued)

(52) U.S. Cl.
CPC ........... *H01M 4/131* (2013.01); *H01M 4/525* (2013.01); *H01M 10/0525* (2013.01);
(Continued)

(58) Field of Classification Search
CPC .. H01M 4/131; H01M 4/0404; H01M 4/0471; H01M 4/364; H01M 4/505;
(Continued)

(56) References Cited

U.S. PATENT DOCUMENTS 8,916,293 B2 * 12/2014 Sugiura .................. C01G 51/42
429/231.8
9,379,375 B2 6/2016 Sugiura et al.
(Continued)

FOREIGN PATENT DOCUMENTS

JP 5587052 B2 9/2014
JP 5703409 B2 4/2015
(Continued)

OTHER PUBLICATIONS

International Search Report and Written Opinion (Application No. PCT/JP2019/040650) dated Dec. 24, 2019 (with English translation).

*Primary Examiner* — Nicholas P D'Aniello
(74) *Attorney, Agent, or Firm* — BURR PATENT LAW, PLLC

(57) ABSTRACT

Provided is a lithium secondary battery including: a positive electrode plate that is a lithium complex oxide sintered plate with a thickness of 50 μm or more; a negative electrode plate; a separator interposed therebetween; and an electrolytic solution. The sintered plate has a structure in which primary grains having a layered rock-salt structure are bound to each other, the lithium complex oxide has a composition represented by $Li_x(Co_{1-y}M_y)O_{2\pm\delta}$, wherein $1.0 \leq x \leq 1.1$, $0 < y \leq 0.8$, and $0 \leq \delta < 1$ are satisfied, and M is at least one selected from Mg, Ni, Al, Ti, and Mn, and the primary grains have a mean tilt angle of over 0° and 30° or less. The mean tilt angle is a mean value of angles defined by (003) planes of the primary grains and the plate face of the sintered plate.

7 Claims, 1 Drawing Sheet

(51) Int. Cl.
*H01M 4/525* (2010.01)
*H01M 10/0525* (2010.01)
*H01M 4/02* (2006.01)

(52) U.S. Cl.
CPC ............... *H01M 2004/021* (2013.01); *H01M 2004/027* (2013.01); *H01M 2004/028* (2013.01)

(58) Field of Classification Search
CPC ............ H01M 4/525; H01M 10/0436; H01M 10/0525; H01M 2004/021; H01M 10/052; H01M 2004/028; C04B 35/01; C04B 38/02; C04B 2235/785; C04B 2235/786; C04B 2235/787; C04B 2111/00853; C04B 35/62218; C04B 2235/6562; C04B 2235/6567; C04B 2235/661; C04B 2235/6587; C04B 2235/77; C04B 2235/6025; C04B 2235/3203; C04B 2235/3275; Y02E 60/10

See application file for complete search history.

(56) References Cited

U.S. PATENT DOCUMENTS

| | | |
|---|---|---|
| 10,454,109 B2 | 10/2019 | Ohira et al. |
| 11,211,599 B2 * | 12/2021 | Yura ................. H01M 4/131 |
| 11,329,270 B2 * | 5/2022 | Yura ................. C01G 51/00 |
| 11,329,285 B2 * | 5/2022 | Yura ................. C04B 35/01 |
| 2012/0009470 A1 * | 1/2012 | Sugiura ............. C01G 51/50 |
| | | 429/211 |
| 2012/0256337 A1 * | 10/2012 | Yokoyama ......... C01G 53/40 |
| | | 241/3 |
| 2017/0373300 A1 * | 12/2017 | Maeda ............ H01M 10/0436 |
| 2019/0355970 A1 | 11/2019 | Yura et al. |
| 2019/0363343 A1 | 11/2019 | Yura et al. |
| 2019/0363357 A1 | 11/2019 | Yura et al. |
| 2019/0363359 A1 | 11/2019 | Yura et al. |

FOREIGN PATENT DOCUMENTS

| | | | |
|---|---|---|---|
| JP | 5752303 B2 | | 7/2015 |
| JP | 2015153695 A | * | 8/2015 |
| JP | 2015-185337 A1 | | 10/2015 |
| WO | 2017/146088 A1 | | 8/2017 |
| WO | 2018/025594 A1 | | 2/2018 |
| WO | 2018/147248 A1 | | 8/2018 |
| WO | 2018/147387 A1 | | 8/2018 |
| WO | 2018/155155 A1 | | 8/2018 |
| WO | 2018/155156 A1 | | 8/2018 |

* cited by examiner

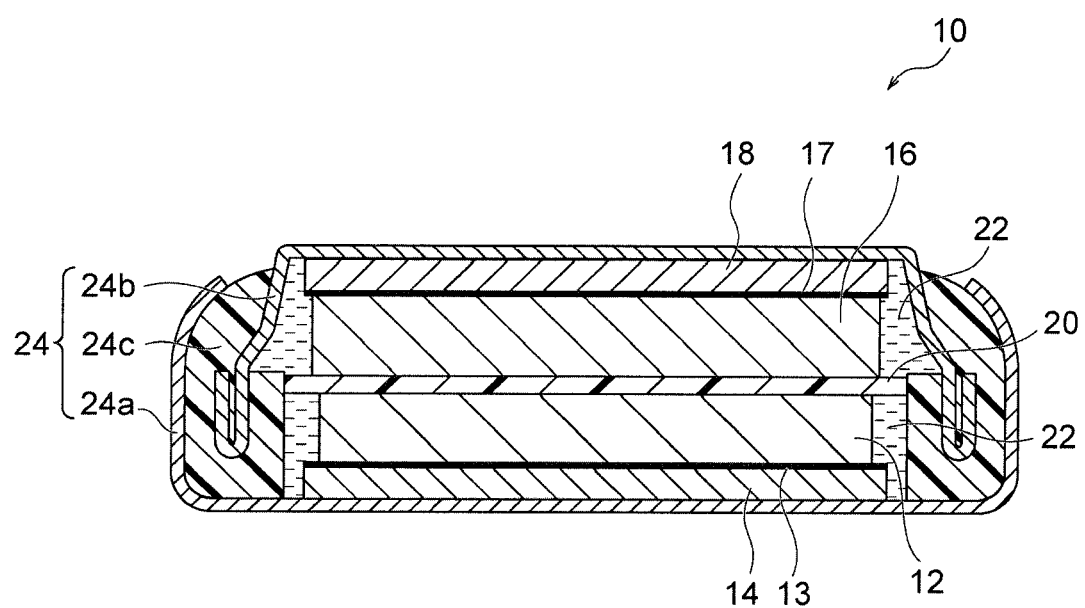

LITHIUM SECONDARY BATTERY

CROSS-REFERENCE TO RELATED APPLICATIONS

This application is a continuation application of PCT/JP2019/040650 filed Oct. 16, 2019, which claims priority to Japanese Patent Application No. 2018-206455 filed Nov. 1, 2018, the entire contents all of which are incorporated herein by reference.

BACKGROUND OF THE INVENTION

1. Field of the Invention

The present invention relates to a lithium secondary battery.

2. Description of the Related Art

Powder-dispersed positive electrodes, which are obtained by kneading and shaping powder of lithium complex oxide (typically, lithium-transition metal oxide) and additives such as binders or conductive agents, are widely known as layers of positive electrode active materials for lithium secondary batteries (also referred to as lithium ion secondary batteries). Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, there has been significant room for improvement in the powder-dispersed positive electrodes in terms of the capacity and charge/discharge efficiency.

Some attempts have been made to improve the capacity and charge/discharge efficiency by positive electrodes or layers of positive electrode active materials composed of lithium complex oxide sintered plate. In this case, since the positive electrodes or the layers of positive electrode active materials contain no binder, high capacity and good charge/discharge efficiency can be expected due to a high packing density of lithium complex oxide.

For example, Patent Literature 1 (JP5587052B) discloses a positive electrode of a lithium secondary battery including a current collector of the positive electrode and a positive electrode active material layer connected to the current collector of the positive electrode with a conductive bonding layer therebetween. The positive electrode active material layer is composed of a lithium complex oxide sintered plate (typically, a $LiCoO_2$ sintered plate) having a thickness of 30 µm or more, a porosity of 3 to 30%, and an open pore rate of 70% or more. In addition, the lithium complex oxide sintered plate has a structure in which numerous primary grains having a grain size of 5 µm or less and a layered rock-salt structure are bonded, and a ratio [003]/[104] of the diffraction intensity on the (003) plane to the diffraction intensity on the (104) plane in X-ray diffractometry is 2 or less.

Patent Literature 2 (JP5752303B) discloses a lithium complex oxide sintered plate (typically, a $LiCoO_2$ sintered plate) for use in a positive electrode of a lithium secondary battery, and the lithium complex oxide sintered plate has a thickness of 30 µm or more, a porosity of 3 to 30%, and an open pore rate of 70% or more. In addition, the lithium complex oxide sintered plate has a structure in which numerous primary grains having a grain size of 2.2 µm or less and a layered rock-salt structure are bonded, and a ratio [003]/[104] of the diffraction intensity on the (003) plane to the diffraction intensity on the (104) plane in X-ray diffractometry is 2 or less.

Patent Literature 3 (JP5703409B) discloses a lithium complex oxide sintered plate (typically, a $LiCoO_2$ sintered plate) for use in a positive electrode of a lithium secondary battery, and the lithium complex oxide sintered plate has a structure in which numerous primary grains having a grain size of 5 µm or less are bonded. In addition, the lithium complex oxide sintered plate has a thickness of 30 µm or more, a mean pore size of 0.1 to 5 µm, and a porosity of 3% or more and less than 15%. Also in the lithium complex oxide sintered plate, a ratio [003]/[104] of the diffraction intensity on the (003) plane to the diffraction intensity on the (104) plane in X-ray diffractometry is 2 or less.

Patent Literature 4 (WO2017/146088) discloses use of an oriented positive electrode plate including a plurality of primary grains composed of lithium complex oxide such as lithium cobaltate ($LiCoO_2$), the plurality of primary grains being oriented at an average orientation angle of over 0° and 30° or less to the plate face in the positive electrode plate, as a positive electrode of a lithium secondary battery including a solid electrolyte.

Patent Literature 5 (JP2015-185337A) discloses a solid-state battery having a positive electrode, a negative electrode, and a solid electrolyte layer, and using a lithium titanate ($Li_4Ti_5O_{12}$) sintered body as the positive electrode or the negative electrode.

CITATION LIST

Patent Literature

[Patent Literature 1] JP5587052B
[Patent Literature 2] JP5752303B
[Patent Literature 3] JP5703409B
[Patent Literature 4] WO2017/146088
[Patent Literature 5] JP2015-185337A

SUMMARY OF THE INVENTION

Meanwhile, it is desired to increase the thickness of positive electrode plates for improving the energy density of lithium secondary batteries. However, a lithium secondary battery provided with a non-oriented $LiCoO_2$ sintered plate with a thickness simply increased to 50 µm or more as a positive electrode may have problems such as resistance increase and performance deterioration when driven or stored at a high temperature of 45° C. or more. Therefore, further improvement in high-temperature durability is desired.

The present inventors have now found that the high-temperature durability is significantly improved in a lithium secondary battery using $LiCoO_2$ sintered plate as a positive electrode by allowing the (003) planes of the primary grains to be oriented at an angle of over 0° and 30° or less on average to the plate face in the sintered plate and substituting a part of Co with a specific element M selected from Mg, Ni, Al, Ti, and Mn.

Accordingly, an object of the present invention is to provide a lithium secondary battery that is less likely to undergo resistance increase and performance deterioration even when driven or stored at a high temperature of 45° C. or more (e.g., 60° C.), that is, a lithium secondary battery that has excellent high-temperature durability.

According to an aspect of the present invention, there is provided a lithium secondary battery comprising: a positive electrode plate that is a lithium complex oxide sintered plate with a thickness of 50 μm or more; a negative electrode plate; a separator interposed between the positive electrode plate and the negative electrode plate; and an electrolytic solution, wherein the lithium complex oxide sintered plate has a structure in which a plurality of primary grains having a layered rock-salt structure are bonded, wherein the lithium complex oxide has a composition represented by $Li_x(Co_{1-y}M_y)O_{2\pm\delta}$, wherein $1.0 \leq x \leq 1.1$, $0 < y \leq 0.8$, and $0 \leq \delta < 1$ are satisfied, and M is at least one selected from the group consisting of Mg, Ni, Al, Ti, and Mn, and wherein the plurality of primary grains have a mean tilt angle of over 0° and 30° or less, the mean tilt angle being a mean value of angles defined by (003) planes of the plurality of primary grains and a plate face of the lithium complex oxide sintered plate.

BRIEF DESCRIPTION OF DRAWING

FIG. 1 is a schematic sectional view showing an example of the secondary battery of the present invention.

DETAILED DESCRIPTION OF THE INVENTION

Definitions

The definitions of the parameters used for specifying the present invention are given below.

The term "porosity" herein refers to the volume ratio of pores (including open pores and closed pores) in a lithium complex oxide sintered plate. The porosity can be measured by analyzing a cross-sectional SEM image of the sintered plate. For example, the sintered plate is processed with a cross section polisher (CP) to expose a polished cross section. The polished cross section is observed with a scanning electron microscope (SEM) at a predetermined magnification (e.g., 1000 folds) and a predetermined field of view (e.g., 125 μm×125 μm). The resultant SEM image is analyzed to divide the total area of all pores in the field of view by the whole area (cross-sectional area) of the sintered plate in the field of view, and the resultant value is multiplied by 100 to give the porosity (%).

The term "mean pore size" herein refers to a volume-based D50 pore size measured for the lithium complex oxide sintered plate in a pore size distribution (cumulative distribution) with the horizontal axis representing the pore size and the vertical axis representing the cumulative volume % (with respect to the total pore volume, 100%). The volume-based D50 pore size is synonymous with the volume-based D50 diameter, which is widely known in the particle size distribution of powders. Accordingly, the volume-based D50 pore size means a pore size at which the cumulative pore volume reaches 50% of the total pore volume. The pore size distribution may be measured by the mercury intrusion method with a mercury porosimeter.

The term "primary grain size" herein refers to the mean grain size of the primary grains constituting the lithium complex oxide sintered plate. The primary grain size can be measured by analyzing a cross-sectional SEM image of the sintered plate. For example, the sintered plate is processed with a cross section polisher (CP) to expose a polished cross section. The polished cross section is observed with a scanning electron microscope (SEM) at a predetermined magnification (e.g., 1000 folds) and a predetermined field of view (e.g., 125 μm×125 μm). In this case, the field of view is set so that 20 or more primary grains are present in the field. In the resultant SEM image, circumscribed circles are drawn for all primary grains, and the diameters of circumscribed circles are measured. Thus, the mean value of these diameters is defined as the primary grain size.

The term "tilt angles of primary grains" herein refers to angles defined by the (003) planes of the primary grains and the plate face of the lithium complex oxide sintered plate. The tilt angles of the primary grains can be measured by analyzing the cross-section of the sintered plate by electron back scattering diffractometry (EBSD). For example, the sintered plate is processed with a cross section polisher (CP) to expose a polished cross section. The polished cross section is analyzed by electron back scattering diffractometry (EBSD) at a predetermined magnification (e.g., 1000 folds) and a predetermined field of view (e.g., 125 μm×125 μm). In the EBSD image, the tilt angle of each primary grain is represented with a color scale, and darker color indicates a smaller tilt angle. Such analysis can indicate the tilt angle of each primary grain. The term "mean tilt angle of primary grains" herein refers to the mean value of angles defined by the (003) planes of the primary grains and the plate face of the lithium complex oxide sintered plate and can be determined by calculating the rate (%) of the area of the grains included in the range of 0° to 30° from the (003) planes with respect to the area of all the grains in the EBSD image at a predetermined magnification (e.g., 1000 folds) and a predetermined field of view (e.g., 125 μm×125 μm).

The term "volume-based D10, D50, and D90 pore sizes" herein refer to volume-based D10, D50, and D90 pore sizes measured for the lithium complex oxide sintered plate in a pore size distribution (cumulative distribution) with the horizontal axis representing the pore size and the vertical axis representing the cumulative volume % (with respect to the total pore volume, 100%). The volume-based D10, D50, and D90 pore sizes are synonymous with the volume-based D10, D50, and D90 diameters, which are widely known in the particle size distribution of powders. Accordingly, the volume-based D10, D50, and D90 pore sizes respectively mean pore sizes at which the cumulative pore volume reaches 10%, 50%, and 90% of the total pore volume. The pore size distribution may be measured by the mercury intrusion method with a mercury porosimeter.

The term "mean pore aspect ratio" herein refers to the mean value of the aspect ratios of pores contained in the lithium complex oxide sintered plate. The aspect ratio of a pore is the ratio of the longitudinal length to the lateral length of the pore. The mean pore aspect ratio can be measured by analyzing a cross-sectional SEM image of the sintered plate. For example, the sintered plate is processed with a cross section polisher (CP) to expose a polished cross section. The polished cross section is observed with a scanning electron microscope (SEM) at a predetermined magnification (e.g., 1000 folds) and a predetermined field of view (e.g., 125 μm×125 μm). The resultant SEM image is binarized with image analysis software to identify the pores from the resultant binarized image. The aspect ratio is calculated by dividing the longitudinal length by the lateral length of each identified pore. The aspect ratios of all pores in the binary image are calculated, and the mean value is determined as the mean pore aspect ratio.

Lithium Secondary Battery

FIG. 1 schematically shows an example of the lithium secondary battery of the present invention. A lithium secondary battery 10 shown in FIG. 1 includes a positive electrode plate 12, a negative electrode plate 16, a separator 20, and an electrolytic solution 22. The positive electrode plate 12 is a lithium complex oxide sintered plate with a thickness of 50 μm or more. The lithium complex oxide sintered plate has a structure in which a plurality of primary grains having a layered rock-salt structure are bonded. Here, the term "bonded" refers to being chemically or physically bonded by sintering, rather than being in contact by simple aggregation of grains, as seen in coated electrodes. The lithium complex oxide has a composition represented by $Li_x(Co_{1-y}M_y)O_{2\pm\delta}$, where $1.0 \le x \le 1.1$, $0 < y \le 0.8$, and $0 \le \delta < 1$ are satisfied, and M is at least one selected from the group consisting of Mg, Ni, Al, Ti, and Mn, the plurality of primary grains have a mean tilt angle of over 0° and 30° or less, and the mean tilt angle is a mean value of angles defined by (003) planes of the plurality of primary grains and the plate face of the lithium complex oxide sintered plate. The separator 20 is interposed between the positive electrode plate 12 and the negative electrode plate 16. Thus, the high-temperature durability in a lithium secondary battery using a $LiCoO_2$ sintered plate as a positive electrode can be significantly improved by allowing the (003) planes of the primary grains to be oriented at an angle of over 0° and 30° or less on average to the plate face in the sintered plate and substituting a part of Co with a specific element M selected from Mg, Ni, Al, Ti, and Mn.

That is, it is desired to increase the thickness of positive electrode plates for improving the energy density of lithium secondary batteries, as described above. However, a lithium secondary battery provided with a non-oriented $LiCoO_2$ sintered plate with a thickness simply increased to 50 μm or more as a positive electrode may have problems such as resistance increase and performance deterioration when driven or stored at a high temperature of 45° C. or more. In contrast, the lithium secondary battery of the present invention is less likely to undergo resistance increase and performance deterioration, even when driven or stored at a high temperature of 45° C. or more (e.g., 60° C.), due to low-angle orientation and element substitution in the $LiCoO_2$ sintered plate, unexpectedly. The reason for this is not clear, but it is presumed to be as follows. That is, in a high-temperature state, if there are variations in performance such as ion diffusion, electron conductivity, and expansion/contraction during charge/discharge in a thick sintered body, the performance deteriorates. Meanwhile, it is considered that the movement of electrons and ions could be made uniform by the low-angle orientation and element substitution as described above, and thereby the deterioration of performance could be suppressed. Further, the sintered plate serving as the positive electrode plate basically contains no binder that thermally decomposes at a high temperature of 100° C. or more, and this point can also be said to contribute to suppressing the performance deterioration or the like when the battery is driven at a high temperature.

The positive electrode plate 12 is a lithium complex oxide sintered plate with a thickness of 50 μm or more. The lithium complex oxide sintered plate has a structure in which a plurality of (that is, numerous) primary grains having a layered rock-salt structure are bonded. Accordingly, these primary grains are composed of a lithium complex oxide having a layered rock-salt structure. The lithium complex oxide used for the positive electrode plate 12 has a composition represented by $Li_x(Co_{1-y} M_y)O_2$, where $1.0 \le x \le 1.1$, $0 < y \le 0.8$, and $0 \le \delta < 1$ are satisfied, and M is at least one selected from the group consisting of Mg, Ni, Al, Ti, and Mn. That is, this composition corresponds to $LiCoO_2$ with a part of Co substituted with another element M. Typically, x is 1.0. Preferably, y satisfies $0.01 \le y \le 0.8$, more preferably $0.02 \le y \le 0.8$, further preferably $0.1 \le y \le 0.8$. δ is a value determined so as to satisfy the charge neutrality condition. Typical lithium complex oxides have a layered rock-salt structure. The layered rock-salt structure refers to a crystalline structure in which lithium layers and transition metal layers other than lithium are alternately stacked with oxygen layers interposed therebetween. That is, the layered rock-salt structure is a crystalline structure in which transition metal ion layers and single lithium layers are alternately stacked with oxide ions therebetween (typically, an α-$NaFeO_2$ structure: a cubic rock-salt structure in which transition metals and lithium are regularly disposed in the [111] axis direction).

In order to improve the sinterability, additives may be added to the positive electrode plate 12. Preferable examples of the additives include those having a melting point of 1000° C. or less, more preferably boric acid, boron oxide, bismuth oxide, or combinations thereof.

The surface of the positive electrode plate 12 may be chemically and/or physically modified. Examples of the typical embodiments of the modification include an embodiment in which the surface of the positive electrode plate 12 is coated with oxides or lithium-containing oxides, or an embodiment in which oxides or lithium-containing oxides are scattered (typically, like islands) on the surface of the positive electrode plate 12. Examples of the oxides include $ZrO_2$, $Al_2O_3$, $WO_3$, and $Nb_2O_5$. Further, the surface of the positive electrode plate 12 includes not only the plate face of the positive electrode plate 12, but also the surface of the primary grains facing pores. The modification method is not particularly limited. Examples thereof include a method in which powder is dispersed in a solvent such as water and alcohol and applied to the surface of the positive electrode plate 12 for heat treatment, and a method in which the surface of the positive electrode plate 12 is dip-coated or spin-coated with an alkoxide solution for heat treatment. The lithium ion conductivity can be improved by modifying the surface of the positive electrode plate 12 as described above.

The mean tilt angle of the plurality of primary grains that constitute the lithium complex oxide sintered plate serving as the positive electrode plate 12 (i.e., the mean value of angles defined by the (003) planes and the plate face) is over 0° and 30° or less, preferably 5° or more and 28° or less, more preferably 10° or more and 250 or less. In addition, the proportion of primary grains having tilt angles (i.e., angles defined by the (003) planes and the plate face) of 0° or more and 30° or less is preferably 60% or more, more preferably 80% or more, furthermore preferably 90% or more, in all the primary grains in the lithium complex oxide sintered plate. The upper limit is not particularly limited and may be 100%, but the proportion of primary grains having a tilt angle of 0° or more and 30° or less is typically 95% or less, more typically 90% or less. It is believed that, within the above range, the stress during charge/discharge cycles can be more advantageously dispersed, resulting in a further improvement in the performance such as rapid charge/discharge performance.

The lithium complex oxide sintered plate serving as the positive electrode plate 12 includes pores. The sintered plate including pores appropriately or uniformly releases the stress occurring due to expansion/contraction of the crystalline lattice accompanying the intercalation/deintercalation of lithium ions during the charge/discharge cycles. Therefore, the grain boundary cracks due to repeated charge/discharge cycles are suppressed as much as possible. In addition, the pores (open pores) included in the interface with the conductive bonding layer increases the bonding strength. The separation at the above bonding interface, which results from the deformation of the lithium complex oxide sintered plate due to the expansion/contraction of the crystalline lattice accompanying the intercalation/deintercalation of lithium ions during charge/discharge cycles, is favorably restrained. As a result, the capacity can be increased while retaining good cycle characteristics. Further, the fact that the pores are filled with the electrolytic solution to form a three-dimensional lithium ion conduction path also has a positive effect on high-speed charge/discharge performance and cycle performance.

The porosity of the lithium complex oxide sintered plate serving as the positive electrode plate 12 is preferably 10 to 55%, more preferably 15 to 50%, further preferably 20 to 40%. The above range improves the stress release effect due to the pores and contributes to enhancing the capacity.

The mean pore size of the lithium complex oxide sintered plate serving as the positive electrode plate 12 is preferably 0.07 to 5 µm, more preferably 0.3 to 3 µm or less. The above range improves the stress release effect due to the pores and contributes to enhancing the capacity.

The distribution and shape of the pores are not particularly limited, but the constituent grains of the lithium complex oxide sintered plate typically have a uniform orientation and a predetermined aspect ratio. Therefore, there is a preferable state for the shape and distribution of the pores. For example, the pores may be oriented so as to be in contact with the lithium ion conductive surface or may have a shape (spherical or amorphous) so as to be widely in contact with the lithium ion conductive surface. In the case that the pores have such an aspect ratio, the pore shape having anisotropy defined by the aspect ratio is considered to contribute to improving the performance such as rapid charge/discharge performance by conveniently dispersing the stress at the time of charging/discharging. Specifically, the mean pore aspect ratio of the lithium complex oxide sintered plate serving as the positive electrode plate 12 is preferably 1.5 to 15, more preferably 2.5 to 12.

The volume-based D10, D50, and D90 pore sizes in the lithium complex oxide sintered plate serving as the positive electrode plate 12 preferably satisfy the relationships of $1.1 \leq D50/D10 \leq 7.1$, $1.1 \leq D90/D50 \leq 7.0$, and $1.2 \leq D90/D10 \leq 50.0$. It is considered that such a unique pore size distribution contributes to improving the performance such as rapid charge performance by conveniently dispersing the stress at the time of charging/discharging. The ratio D50/D10 is preferably 1.1 to 7.1, more preferably 1.2 to 5.5, further preferably 1.3 to 4.0. The ratio D90/D50 is preferably 1.1 to 7.0, more preferably 1.2 to 5.0, further preferably 1.3 to 4.0. The ratio D90/D10 is preferably 1.2 to 50.0, more preferably 1.5 to 40.

The thickness of the lithium complex oxide sintered plate serving as the positive electrode plate 12 is 50 µm or more, preferably 50 to 500 µm, more preferably 90 to 400 µm, particularly preferably 100 to 300 µm. As described above, the larger the thickness of the lithium complex oxide sintered plate, the more easily a battery with high capacity and high energy density is achieved. The thickness of the lithium complex oxide sintered plate is determined by measuring the distance between two substantially parallel faces of the plate, for example, when the cross section of the lithium complex oxide sintered plate is observed by SEM (scanning electron microscopy). Further, the size of the positive electrode plate 12 (that is, the lithium complex oxide sintered plate) is preferably 5 mm×5 mm square or more, more preferably 10 mm×10 mm square or more, in other words, preferably 25 mm² or more, more preferably 100 mm² or more.

The primary grain size, which is the mean grain size of the plurality of primary grains that constitute the lithium complex oxide sintered plate serving as the positive electrode plate 12, is preferably 20 µm or less, more preferably 15 µm or less. In general, as the primary grain size decreases, the number of grain boundaries increases. As the number of grain boundaries increases, the internal stress generated in the expansion/contraction of the crystalline lattice accompanying the charge/discharge cycles is dispersed more favorably. In addition, also when cracking occurs, extension of cracks is suppressed more favorably, as the number of grain boundaries increases. Meanwhile, the grains of the sintered plate in the present invention are orientated in the same direction, as a result of which the stress is less likely to be applied to the grain boundaries, and even the grains with large sizes have excellent cycle performance. In addition, in the case where the grain sizes are large, the diffusion of lithium during charge/discharge cycles is less likely to be blocked at grain boundaries, which is suitable for rapid charge/discharge. The primary grain size is typically 0.2 µm or more, more typically 0.4 µm or more.

The negative electrode plate 16 is not particularly limited, as long as it is a layer containing a negative electrode active material that can be applied to the lithium secondary battery 10 but preferably contains a negative electrode active material in the form of an oxide. The negative electrode active material in the form of an oxide is preferably an oxide containing at least Ti. Preferable examples of the negative electrode active material include lithium titanate $Li_4Ti_5O_{12}$ (which will be hereinafter referred to as LTO), niobium titanium complex oxide $Nb_2TiO_7$, and titanium oxide $TiO_2$, more preferably LTO and $Nb_2TiO_7$. LTO is typically known to have a spinel structure but can have other structures during charge/discharge. For example, the reaction of LTO proceeds in the two-phase coexistence of $Li_4Ti_5O_{12}$ (spinel structure) and $Li_7Ti_5O_{12}$ (rock salt structure) during charge/discharge. Accordingly, the structure of LTO is not limited to the spinel structure.

It is preferable that the plurality of grains of the negative electrode active material contained in the negative electrode plate 16 are physically and electrically connected to each other, for enhancing the electron conductivity and the ion conductivity, while enhancing the energy density. Accordingly, the negative electrode plate 16 is preferably a sintered plate (e.g., LTO or $Nb_2TiO_7$ sintered plate). Since the negative electrode plate contains no binder in the case where it is a sintered plate, high capacity and good charge/discharge efficiency can be achieved by high packing density of the negative electrode active material (e.g., LTO or $Nb_2TiO_7$). The reason why the negative electrode plate contains no binder is that, even if a binder is contained in a green sheet, the binder disappears or burns out during firing. The LTO sintered plate can be produced according to the method described in Patent Literature 5 (JP2015-185337A). Further, the negative electrode plate 16 containing no binder can be electrically stable for a long time at a high temperature of 100° C. or more and can ensure battery drive or battery storage performance.

The negative electrode plate 16 preferably contains pores. When the negative electrode plate 16 contains pores, the pores favorably (uniformly) release the stress occurring due to the expansion/contraction of crystalline lattice accompanying the intercalation/deintercalation of carrier ions (e.g., lithium ions) during the charge/discharge cycles. Therefore, the grain boundary cracks due to repeated charge/discharge cycles are suppressed as much as possible.

The porosity of the negative electrode plate 16 is preferably 2 to 55%, more preferably 10 to 40%. Within such a range, the stress release effect due to the pores and the effect of enhancing the capacity can be desirably achieved. The porosity of the negative electrode plate 16 is the volume ratio of pores (including open pores and closed pores) in the negative electrode plate 16 and can be measured by analyzing the cross-sectional SEM image of the negative electrode plate 16, as will be described in detail in EXAMPLES below.

The thickness of the negative electrode plate 16 is 25 μm or more, preferably 30 μm or more, more preferably 40 μm or more, particularly preferably 50 μm or more, most preferably 55 μm or more, for improving the energy density of the lithium secondary battery 10 by increasing the capacity of the active material per unit area. The upper limit of the thickness is not particularly limited, but the thickness of the negative electrode plate 16 is preferably 400 μm or less, more preferably 300 μm or less, for suppressing the deterioration of the battery characteristics (particularly, the increase of the resistance value) due to repeated charging and discharging. Further, the size of the negative electrode plate 16 is preferably 5 mm×5 mm square or more, more preferably 10 mm×10 mm square or more, in other words, preferably 25 mm$^2$ or more, more preferably 100 mm$^2$ or more.

The separator 20 is preferably a separator made of cellulose or ceramic. Separators made of cellulose are advantageous in that they are inexpensive and have excellent heat resistance. As being different from widely used separators made of polyolefin with poor heat resistance, separators made of cellulose themselves have not only excellent heat resistance, but also the component of the electrolytic liquid, γ-butyrolactone (GBL), having excellent heat resistance exhibits excellent wettability thereon. Accordingly, in the case of using an electrolytic solution containing GBL, the electrolytic solution can sufficiently penetrate into the separator (without repelling). Meanwhile, separators made of ceramics are advantageous in that they, of course, have excellent heat resistance and can be produced as one integrated sintered body together with the positive electrode plate 12 and the negative electrode plate 16 as a whole. In the case of using a ceramic separator, the ceramic constituting the separator is preferably at least one selected from MgO, Al$_2$O$_3$, ZrO$_2$, SiC, Si$_3$N$_4$, AlN, and cordierite, more preferably at least one selected from MgO, Al$_2$O$_3$, and ZrO$_2$.

The electrolytic solution 22 is not particularly limited, and commercially available electrolytic solutions for lithium batteries such as a solution in which a lithium salt is dissolved in a non-aqueous solvent such as an organic solvent may be used. In particular, an electrolytic solution having excellent heat resistance is preferable, and such an electrolytic solution preferably contains lithium borofluoride (LiBF$_4$) in a non-aqueous solvent. In this case, the non-aqueous solvent is preferably at least one selected from the group consisting of γ-butyrolactone (GBL), ethylene carbonate (EC) and propylene carbonate (PC), more preferably a mixed solvent composed of EC and GBL, a single solvent composed of PC, a mixed solvent composed of PC and GBL, or a single solvent composed of GBL, particularly preferably a mixed solvent composed of EC and GBL or a single solvent composed of GBL. The non-aqueous solvent has an increased boiling point by containing γ-butyrolactone (GBL), which considerably improves the heat resistance. From such a viewpoint, the volume ratio of EC:GBL in the EC and/or GBL-containing non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride (LiBF$_4$) to be dissolved in the non-aqueous solvent is an electrolyte having a high decomposition temperature, which also considerably improves the heat resistance. The LiBF$_4$ concentration in the electrolytic solution 22 is preferably 0.5 to 2 mol/L, more preferably 0.6 to 1.9 mol/L, further preferably 0.7 to 1.7 mol/L, particularly preferably 0.8 to 1.5 mol/L.

The electrolytic solution 22 may further contain vinylene carbonate (VC) and/or fluoroethylene carbonate (FEC) and/or vinyl ethylene carbonate (VEC) as additives. Both VC and FEC have excellent heat resistance. Accordingly, a SEI film having excellent heat resistance can be formed on the surface of the negative electrode plate 16 by the electrolytic solution 22 containing such additives.

The exterior body 24 includes a closed space, and the closed space accommodates the positive electrode plate 12, the negative electrode plate 16, the separator 20, and the electrolytic solution 22. The exterior body 24 may adopt a structure generally adopted for coin-shaped batteries as shown in the illustrated examples or another configuration and is not particularly limited. In the case of a coin-shaped battery, the exterior body 24 typically includes a positive electrode can 24a, a negative electrode can 24b, and a gasket 24c, and the positive electrode can 24a and the negative electrode can 24b are crimped via the gasket 24c to form the closed space. The positive electrode can 24a and the negative electrode can 24b can be made of metals such as stainless steel and are not particularly limited. The gasket 24c can be an annular member made of an insulating resin such as polypropylene or polytetrafluoroethylene and is not particularly limited.

The lithium secondary battery 10 preferably further includes a positive electrode current collector 14 and/or a negative electrode current collector 18. The positive electrode current collector 14 and the negative electrode current collector 18 are not particularly limited but are preferably metal foils such as copper foils and aluminum foils. The positive electrode current collector 14 is preferably interposed between the positive electrode plate 12 and the positive electrode can 24a, and the negative electrode current collector 18 is preferably interposed between the negative electrode plate 16 and the negative electrode can 24b. Further, a positive-side carbon layer 13 is preferably provided between the positive electrode plate 12 and the positive electrode current collector 14 for reducing the contact resistance. Likewise, a negative-side carbon layer 17 is preferably provided between the negative electrode plate 16 and the negative electrode current collector 18 for reducing the contact resistance. Both the positive-side carbon layer 13 and the negative-side carbon layer 17 are preferably composed of conductive carbons and may be formed, for example, by applying a conductive carbon paste by screen printing or the like.

Production Method

The lithium complex oxide sintered plate of the present invention may be produced by any method but is preferably produced through (a) production of a lithium complex oxide-containing green sheet and (b) firing of the green sheet.

(a) Production of Lithium Complex Oxide-Containing Green Sheet

A raw material powder composed of lithium complex oxide is prepared. This powder preferably contains synthesized platy particles having a basic composition of Li(Co,M)O$_2$ (M is at least one substitution element selected from Mg, Ni, Al, Ti, and Mn). The volume-based D50 particle diameter of the raw material powder is preferably 0.3 to 30 μm. For example, the Li(Co,M)O$_2$ platy particles can be produced as follows. First, Co$_3$O$_4$ raw material powder, Li$_2$CO$_3$ raw material powder, and powder of a compound containing a substitution element M (e.g., MgCO$_3$ powder, Ni(OH)$_2$ powder, AlOOH powder, MnCO$_3$ powder, and/or TiO$_2$ powder, or a composite hydroxide obtained by the coprecipitation method) are weighed and mixed to give a predetermined composition, followed by firing (500 to 900° C. for 1 to 20 hours), to synthesize Li(Co,M)O$_2$ powder. The resultant Li(Co,M)O$_2$ powder is milled into a volume-based D50 particle diameter of 0.2 μm to 10 μm with a pot mill to yield platy Li(Co,M)O$_2$ particles capable of conducting lithium ions along the faces of the plate. Such Li(Co,M)O$_2$ particles are also produced by a procedure involving particle growth in a green sheet from Li(Co,M)O$_2$ powder slurry and crushing the green sheet, or a procedure involving synthesis of platy crystals, such as a flux process, a hydrothermal synthesis process, a single crystal growth process using a melt, and a sol gel process. The resultant Li(Co,M)O$_2$ particles are susceptible to cleavage along a cleavage plane. The Li(Co,M)O$_2$ particles may be cleaved by crushing to produce Li(Co,M)O$_2$ platy particles.

The platy particles may be independently used as raw material powder, or a mixed powder of the platy powder and another raw material powder (e.g., CO$_3$O$_4$ particles and particles of a compound containing the element M) may be used as a raw material powder. In the latter case, it is preferred that the platy powder serves as template particles for providing orientation, and another raw material powder (e.g., Co$_3$O$_4$ particles and particles of a compound containing the element M) serves as matrix particles that can grow along the template particle. In this case, powder obtained by mixing the template particles to matrix particles at a ratio of 100:0 to 3:97 is preferably used as the raw material powder. When Co$_3$O$_4$ raw material powder and element M-containing compound powder are used as the matrix particles, the volume-based D50 particle diameters of the Co$_3$O$_4$ raw material powder and the element M-containing compound powder are not particularly limited and can be, for example, 0.1 to 1.0 μm but is preferably smaller than the volume-based D50 particle diameter of Li(Co,M)O$_2$ template particles. The Co-based matrix particles may also be produced by heating a Co(OH)$_2$ raw material at 500° C. to 800° C. for 1 to 10 hours. In addition to CO$_3$O$_4$, Co(OH)$_2$ particles or LiCoO$_2$ particles may be used as the Co-based matrix particles.

When the raw material powder is composed of 100% of Li(Co,M)O$_2$ template particles, or when Li(Co,M)O$_2$ particles are used as the matrix particles, a large (e.g., 90 mm×90 mm square) flat Li(Co,M)O$_2$ sintered plate can be yielded by firing. Although the mechanism is not clear, it is inferred that, since Li(Co,M)O$_2$ is not synthesized in the firing process, volume change or local unevenness are less likely to occur.

The raw material powder is mixed with a dispersive medium and various additives (e.g., binders, plasticizers, and dispersants) to form a slurry. Another lithium compound (e.g., lithium carbonate) in an excess amount of about 0.5 to 30 mol % may be added to the slurry to promote the grain growth or compensate for a volatile component in the firing process, which will be described later. A pore-forming material may be added to the slurry, and desired pores can be introduced into the sintered body by adjusting the particle size of the raw material, the density of the green body, the firing conditions, and the like. It is preferable that the slurry is defoamed by stirring under reduced pressure, and the viscosity is adjusted into 4000 to 10000 cP. The slurry obtained is shaped into a sheet, to obtain a lithium complex oxide-containing green sheet (e.g., Li(Co,M)O$_2$ green sheet). The resultant green sheet is a green sheet in the form of an independent sheet. The independent sheet (also referred to as a "self-supported film") refers to a sheet (including flakes having an aspect ratio of 5 or more) that can be handled alone independently from another support. In other words, the independent sheet does not refer to a sheet that is fixed to another support (such as a substrate) and integrated with the support (so as to be inseparable or hard to separate). The sheet is preferably shaped by a shaping method capable of applying a shear force to the platy particles (for example, template particles) in the raw material powder. Thus, the primary grains can have a mean tilt angle of over 0° and 30° or less to the plate face. The shaping method capable of applying a shear force to the platy particles is suitably a doctor blade method. The thickness of the green sheet containing the lithium complex oxide may be appropriately selected so as to give the above desired thickness after firing.

(b) Firing of Green Sheet

The lithium complex oxide-containing green sheet (e.g., Li(Co,M)O$_2$ green sheet) is placed on the bottom setter, and the top setter is placed thereon. The top and bottom setters are made of ceramic, preferably zirconia or magnesia. If the setters are made of magnesia, the pores tend to be smaller. The top setter may have a porous structure, a honeycomb structure, or a dense structure. If the top setter has a dense structure, the pores in the sintered plate tend to be smaller.

After the green sheet containing the lithium complex oxide (e.g., a Li(Co,M)O$_2$ green sheet) is placed on the bottom setter, the green sheet may be optionally degreased and then calcined at 600 to 850° C. for 1 to 10 hours.

The green sheet and/or the calcined plate disposed between the setters are optionally degreased and heated (fired) at a firing temperature in a medium temperature range (e.g., 700 to 1000° C.) to give a lithium complex oxide sintered plate (e.g., Li(Co,M)O$_2$ sintered plate). This firing process may be performed in one or two steps. In the case of firing in two separate steps, the temperature in the first firing step is preferably lower than that in the second firing step. The resultant sintered plate is also in the form of an independent sheet.

EXAMPLES

The invention will be described further in detail by the following examples. In the following description, the composition, Li$_x$(Co$_{1-y}$M$_y$)O$_{2\pm\delta}$, where x, y, and δ are as described above, and M is at least one selected from Mg, Ni, Al, Ti, and Mn, will be abbreviated as Li(Co,M)O$_2$.

Examples 1 to 6

(1) Production of Positive Electrode Plate
(1a) Production of Li(Co,M)O$_2$ Green Sheet Li$_2$CO$_3$ powder (manufactured by THE HONJO CHEMICAL CORPORATION), Ni(OH)$_2$ powder (manufactured by ISE CHEMICALS CORPORATION), Co$_3$O$_4$ powder (average particle size D50: 0.9 μm, manufactured by SEIDO CHEMICAL INDUSTRY CO., LTD.), $MnCO_3$ powder (manufactured by Kojundo Chemical Laboratory Co., Ltd.), $MgCO_3$ powder (manufactured by Konoshima Chemical Co., Ltd.), AlOOH powder (manufactured by KANTO DENKA KOGYO CO., LTD.), and $TiO_2$ powder (manufactured by ISHIHARA SANGYO KAISHA, LTD.) were prepared. Three or four of these powders were weighed and mixed so as to give the composition shown in Table 1 after firing. The resultant mixture was kept at 800° C. for 5 hours to obtain calcined powder. The calcined powder was milled into platy particles with an average particle size D50 of 0.5 μm using a pot mill. 100 parts by weight of the powder obtained, 100 parts by weight of a dispersion medium (toluene:isopropanol=1:1), 10 parts by weight of a binder (polyvinyl butyral: product number BM-2, manufactured by SEKISUI CHEMICAL CO., LTD.), 4 parts by weight of a plasticizer (DOP: Di(2-ethylhexyl)phthalate, manufactured by Kurogane Kasei Co., Ltd.), and 2 parts by weight of a dispersant (product name: RHEODOL SP-030, manufactured by Kao Corporation) were mixed. The resultant mixture was defoamed by stirring under reduced pressure, and the viscosity was adjusted to 4000 cP, to prepare a Li(Co,M)$O_2$ slurry. The viscosity was measured with an LVT viscometer manufactured by AMETEK Brookfield. The slurry prepared was shaped into a sheet on a PET film by a doctor blade method, to form a green sheet. The thickness of the green sheet after drying was 220 μm.

(1b) Production of Li(Co,M)$O_2$ Sintered Plate

The Li(Co,M)$O_2$ green sheet separated from the PET film was cut into 50 mm square with a cutter. The cut piece was placed on the center of a magnesia setter serving as the bottom setter (dimensions: 90 mm square, height 1 mm), and a porous magnesia setter serving as the top setter was placed thereon. The green sheet piece disposed between the setters was put into an alumina sheath of 120 mm square (manufactured by NIKKATO CORPORATION). At this time, the alumina sheath was not tightly sealed and was covered with a lid with a gap of 0.5 mm. The stack obtained was heated to 600° C. at a heating rate of 200° C./h and degreased for 3 hours, and then kept at 800° C. for 20 hours for firing. After the firing, the fired body was cooled to room temperature and taken out of the alumina sheath. Thus, a Li(Co,M)$O_2$ sintered plate was obtained as the positive electrode plate. The positive electrode plate obtained was shaped with a laser into 10 mm×10 mm square.

(2) Production of Negative Electrode Plate (2a) Production of LTO Green Sheet 100 parts by weight of LTO powder (volume-based D50 particle size 0.06 μm, manufactured by Sigma-Aldrich Japan), 100 parts by weight of a dispersion medium (toluene:isopropanol=1:1), 20 parts by weight of a binder (polyvinyl butyral: product number BM-2, manufactured by SEKISUI CHEMICAL CO., LTD.), 4 parts by weight of a plasticizer (DOP: Di(2-ethylhexyl)phthalate, manufactured by Kurogane Kasei Co., Ltd.), and 2 parts by weight of a dispersant (product name: RHEODOL SP-030, manufactured by Kao Corporation) were mixed. The resultant negative electrode raw material mixture was defoamed by stirring under reduced pressure, and the viscosity was adjusted to 4000 cP, to prepare a LTO slurry. The viscosity was measured with an LVT viscometer manufactured by AMETEK Brookfield. The slurry prepared was shaped into a sheet on a PET film by a doctor blade method, to form a LTO green sheet. The thickness of the LTO green sheet after drying was adjusted to 240 μm after firing.

(2b) Firing of LTO Green Sheet

The green sheet obtained was cut into 25 mm square with a cutter knife and disposed on an embossed zirconia setter. The green sheet on the setter was put into an alumina sheath, kept at 500° C. for 5 hours, then heated at a heating rate of 200° C./h, and fired at 800° C. for 5 hours. An Au film (with a thickness of 100 nm) as a current collecting layer was formed on the surface of the resultant LTO sintered plate in contact with the setter by sputtering and shaped with a laser into 10 mm×10 mm square.

(3) Production of Coin-Shaped Lithium Secondary Battery

The coin-shaped lithium secondary battery 10 as schematically shown in FIG. 1 was produced as follows.

(3a) Adhesion of Negative Electrode Plate and Negative Electrode Current Collector with Conductive Carbon Paste Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil serving as the negative electrode current collector. The negative electrode plate produced in Procedure (2) above was disposed within an undried printing pattern (that is, a region coated with the conductive carbon paste), followed by vacuum drying at 60° C. for 30 minutes, to produce a negative electrode structure with the negative electrode plate and the negative electrode current collector bonded via a carbon layer. The carbon layer had a thickness of 10 μm.

(3b) Preparation of Positive Electrode Current Collector with Carbon Layer

Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil serving as the positive electrode current collector, followed by vacuum drying at 60° C. for 30 minutes, to produce a positive electrode current collector with a carbon layer formed on a surface. The carbon layer had a thickness of 5 μm.

(3c) Assembling of Coin-Shaped Battery

The positive electrode current collector, the carbon layer, the Li(Co,M)$O_2$ positive electrode plate, a cellulose separator, the LTO negative electrode plate, the carbon layer, and the negative electrode current collector were accommodated between the positive electrode can and the negative electrode can, which would constitute a battery case, so as to be stacked in this order from the positive electrode can toward the negative electrode can, and an electrolytic solution was filled therein. Thereafter, the positive electrode can and the negative electrode can were crimped via a gasket to be sealed. Thus, the coin cell-shaped lithium secondary battery 10 with a diameter of 12 mm and a thickness of 1.0 mm was produced. At this time, the electrolytic solution was a solution of $LiBF_4$ (1.5 mol/L) in a mixed organic solvent of ethylene carbonate (EC) and γ-butyrolactone (GBL) at 1:3.

(4) Evaluation

The Li(Co,M)$O_2$ sintered plate (positive electrode plate) synthesized in Procedure (1b) above and the battery manufactured in Procedure (3) above were evaluated for various properties as shown below.

<Composition and Amount of Co>

The number of moles of each element was determined by ICP emission spectroscopy, to calculate the composition of the Li(Co,M)$O_2$ sintered plate. Further, the molar amount $A_M$ of the substitution element M shown in Table 1 and the molar amount $A_{Co}$ of Co were measured by ICP emission spectroscopy, to calculate the occupancy ratio R (%) of Co in the (Co,M) site as the amount of Co, based on the following formula.

$$R=[A_{Co}/(A_{Co}+A_M)]\times 100$$

<Mean Tilt Angle of Primary Grains>

The Li(Co,M)O$_2$ sintered plate was polished with a cross section polisher (CP) (IB-15000CP, manufactured by JEOL Ltd.), and the resultant cross-section of the positive electrode plate (cross-section perpendicular to the plate face of the positive electrode plate) was subjected to the EBSD measurement at a 1000-fold field of view (125 μm×125 μm) to give an EBSD image. This EBSD measurement was performed using a Schottky field emission scanning electron microscope (model JSM-7800F, manufactured by JEOL Ltd). For all grains identified in the resultant EBSD image, the angles defined by the (003) planes of the primary grains and the plate face of the positive electrode plate (that is, the tilts of the crystal orientation from the (003) planes) are determined as tilt angles. The mean value of the angles was determined as a mean tilt angle of the primary grains.

<Thickness>

The Li(Co,M)O$_2$ sintered plate was polished with a cross section polisher (CP) (IB-15000CP, manufactured by JEOL Ltd.), and the resultant cross-section of positive electrode plate was observed with SEM (JSM 6390 LA, manufactured by JEOL Ltd.) to determine the thickness of the positive electrode plate. The thickness of the dried LiCoO$_2$ green sheet described above in Procedure (1a) was also determined in the same manner.

<Porosity>

The Li(Co,M)O$_2$ sintered plate was polished with a cross section polisher (CP) (IB-15000CP, manufactured by JEOL Ltd.), and the resultant cross-section of the positive electrode plate was observed with SEM (JSM 6390 LA, manufactured by JEOL Ltd.) at a 1000-fold field of view (125 μm×125 μm). The resultant SEM image was analyzed to divide the total area of all pores by the area of the positive electrode, and the resultant value was multiplied by 100 to calculate the porosity (%).

<Mean Pore Size>

The volume-based pore size distribution of the Li(Co,M)O$_2$ sintered plate was measured by a mercury intrusion method using a mercury porosimeter (Autopore IV 9510, manufactured by Shimadzu Corporation). The volume-based D50 pore size was determined from the pore size distribution curve thus obtained with the horizontal axis serving as the pore size and the vertical axis serving as the cumulative volume %, to give the mean pore size.

<Pore Size Distribution>

The volume-based pore size distribution of the Li(Co,M)O$_2$ sintered plate was measured by a mercury intrusion method using a mercury porosimeter (Autopore IV 9510, manufactured by Shimadzu Corporation). The volume-based D10, D50, and D90 pore sizes were determined from the pore size distribution curve thus obtained with the horizontal axis serving as the pore size and the vertical axis serving as the cumulative volume %, to calculate the ratios D50/D10, D90/D50, and D90/D10.

<Mean Pore Aspect Ratio>

The Li(Co,M)O$_2$ sintered plate was polished with a cross section polisher (CP) (IB-15000CP, manufactured by JEOL Ltd.), and the resultant cross-section of the positive electrode plate was observed with SEM (JSM 6390 LA, manufactured by JEOL Ltd.) at a 1000-fold field of view (125 μm×125 μm). The resultant SEM image was binarized with image analysis software ImageJ to identify the pores from the resultant binarized image. The aspect ratio was calculated by dividing the longitudinal length by the lateral length of each identified pore in the binarized image. The aspect ratios of all pores in the binary image were calculated. The mean value was determined as a mean pore aspect ratio.

<Capacity Retention at High Temperature (High-Temperature Durability)>

The capacity retention of the battery at an actuation temperature of 45° C. or 60° C. was measured by the following procedure in the potential range of 2.7 V to 1.5 V.

(i) The battery was charged at a rate of 0.2 C under a constant current until the battery voltage reached 2.7 V, continuously charged under a constant voltage until the current value reached 0.02 C rate, and then discharged at a rate of 0.2 C until the voltage reached 1.5 V. This charge/discharge cycle was repeated three times in total to measure the discharge capacities. The mean value was determined as an initial discharge capacity.

(ii) The battery was charged to 2.7 V at a charge rate of 0.5 C, stored for one week, and then discharged to 1.5 V at a discharge rate of 0.5 C.

(iii) The battery was charged at a rate of 0.2 C under a constant current until the battery voltage reached 2.7 V, continuously charged under a constant voltage until the current value reached 0.02 C rate, and then discharged at a rate of 0.2 C until the voltage reached 1.5 V. This charge/discharge cycle was repeated three times in total to measure the discharge capacities. The mean value was determined as the discharge capacity after high-temperature durability.

(iv) The ratio of the discharge capacity measured in Procedure (iii) to the initial discharge capacity measured in Procedure (i) was calculated, and the ratio was multiplied by 100 to determine the capacity retention (%). The capacity retention can be regarded as an index indicating the high-temperature durability of the battery.

Example 7

A positive electrode plate and a battery were produced in the same manner as in Example 1 except that the thickness of the green sheet was reduced so that the thickness of the positive electrode plate was 50 μm, and various evaluations were performed.

Example 8

A positive electrode plate and a battery were produced in the same manner as in Example 1 except that the thickness of the green sheet was increased so that the thickness of the positive electrode plate was 400 μm, and various evaluations were performed.

Example 9

A positive electrode plate and a battery were produced in the same manner as in Example 1 except that the calcined powder was milled to obtain platy particles with an average particle size D50 of 0.2 μm in the production of the positive electrode plate, and various evaluations were performed.

Example 10

A positive electrode plate and a battery were produced in the same manner as in Example 1 except that, in the production of the positive electrode plate, 1) the mixture was kept at 500° C. for 10 hours, then heated at a heating rate of 200° C./h, and kept at 850° C. for 5 hours for firing to obtain the calcined powder, 2) the calcined powder was milled to obtain platy particles with an average particle size D50 of 0.5 μm, and 3) the green sheet was kept at 500° C. for 10 hours, then heated to 825° C. at a heating rate of 200° C./h, and kept for 40 hours for firing, and various evaluations were performed.

Example 11

A positive electrode plate and a battery were produced in the same manner as in Example 1 except that, in the production of the positive electrode plate, 1) the Co raw material used was cobalt oxide (manufactured by SEIDO CHEMICAL INDUSTRY CO., LTD.) with an average particle size D50 of 0.3 μm, 2) the raw material powders after weighing were milled with a pot mill for 20 hours, and 3) the calcined powder was milled to obtain platy particles with an average particle size D50 of 0.2 μm, and various evaluations were performed.

Example 12

A positive electrode plate and a battery were produced in the same manner as in Example 1 except that, in the production of the positive electrode plate, 1) the mixture was fired at 900° C. for 5 hours to obtain the calcined powder, 2) the calcined powder was milled to obtain platy particles with an average particle size D50 of 0.8 μm, 3) $LiOH \cdot H_2O$ (manufactured by Wako Kagaku Co., Ltd.) was added to the slurry for tape shaping to give a molar ratio Li/(Co,Mn,Ni) of 1.05, and 4) the firing conditions were such that the green sheet was kept at 500° C. for 10 hours, then heated at a heating rate 200° C./h, fired at 900° C. for 1 hour, and then fired at 800° C. for 20 hours, and various evaluations were performed.

Example 13

A positive electrode plate and a battery were produced in the same manner as in Example 1 except that the platy particles obtained by milling the calcined powder were subjected to airflow classification to remove coarse particles of 1 μm or more in the production of the positive electrode plate, and various evaluations were performed.

Example 14

A positive electrode plate and a battery were produced in the same manner as in Example 1 except that, in the production of the positive electrode plate, 1) the platy particles obtained by milling the calcined powder was mixed powder containing the platy particles obtained in Example 1, Example 11, and Example 12 at a weight ratio of 20%:40%:40%, and 2) the green sheet was fired by being kept at 500° C. for 10 hours, then heated at a heating rate of 200° C./h, and then kept at 700° C. for 72 hours, and various evaluations were performed.

Example 15

A positive electrode plate and a battery were produced in the same manner as in Example 1 except that, in the production of the positive electrode plate, 1) the mixture was fired at 600° C. to obtain the calcined powder, 2) the calcined powder was milled to obtain platy particles with an average particle size D50 of 0.6 μm, and 3) mixed powder containing the powder milled in Procedure 2) above and the milled powder of Example 1 at a weight ratio of 70%:30% was used for the preparation of the slurry, and various evaluations were performed.

Example 16

A positive electrode plate and a battery were produced in the same manner as in Example 1 except that, in the production of the positive electrode plate, 1) $Co(OH)_2$ powder (manufactured by CoreMax Corporation) was used instead of the $Co_3O_4$ powder, 2) $Ni(OH)_2$ powder (manufactured by ISE CHEMICALS CORPORATION) different from that in Example 1 was used as the $Ni(OH)_2$ powder, 3) the calcined powder was milled to obtain platy particles with an average particle size D50 of 0.4 μm, and 4) the green sheet (tape green body) was subjected to cold isotropic pressing (CIP) under conditions of 90° C. and 200 kg/cm$^2$ before firing, and various evaluations were performed.

Example 17 (Comparison)

A positive electrode plate and a battery were produced in the same manner as in Example 1 except that the green sheet was produced as follows, and various evaluations were performed.

(Production of Green Sheet)

100 parts by weight of the milled powder (average particle size D50:0.2 μm) produced in Example 10, 400 parts by weight of pure water as a dispersion medium, 1 part by weight of a binder (polyvinyl alcohol: product number VP-18, manufactured by JAPAN VAM & POVAL CO., LTD.), 1 part by weight of a dispersant (MALIALIM KM-0521, manufactured by NOF CORPORATION), and 0.5 parts by weight of a defoamer (1-octanol: manufactured by Wako Pure Chemical Industries, Ltd.) were mixed. The resultant mixture was defoamed by stirring under reduced pressure, and the viscosity was adjusted to 0.5 P·s (measured with a LVT viscometer, manufactured by AMETEK Brookfield), to prepare a slurry. The slurry was processed under conditions of a fluid volume of 150 g/min, an inlet temperature of 160° C., and an atomizer rotation speed of 25000 rpm with a spray dryer (type OC-16: manufactured by Ohkawara Kakohki Co., Ltd.), to obtain a spherical green body. 100 parts by weight of the resultant powder, 100 parts by weight of a dispersive medium (toluene:isopropanol=1:1), 10 parts by weight of a binder (polyvinyl butyral: Product No. BM-2, manufactured by SEKISUI CHEMICAL CO., LTD.), 4 parts by weight of a plasticizer (DOP: Di(2-ethylhexyl)phthalate, manufactured by Kurogane Kasei Co., Ltd.), and 2 parts by weight of a dispersant (product name: RHEODOL SP-030, manufactured by Kao Corporation) were mixed. The resultant mixture was defoamed by stirring under reduced pressure, and the viscosity was adjusted to 4000 cP, to prepare a $Li(Co,Mg)O_2$ slurry. The viscosity was measured with an LVT viscometer manufactured by AMETEK Brookfield. The slurry prepared was shaped into a sheet on a PET film by a doctor blade method, to form a green sheet. The thickness of the green sheet after drying was 220 μm. The green sheet was fired by being heated to 600° C. at a heating rate of 200° C./h in an oxygen atmosphere, degreased for 3 hours, and then kept at 1000° C. for 20 hours.

Evaluation Results

Table 1 shows the evaluation results for Examples 1 to 17.

TABLE 1

| | Positive electrode plate | | | | | | | | | | Capacity retention at high temperature | |
|---|---|---|---|---|---|---|---|---|---|---|---|---|
| | | Amount of Co | Mean tilt | Thick- | Por- osity | Mean pore | Pore size distribution | | | Mean pore | | |
| Example | Composition | (mol %) | angle (°) | ness (μm) | (vol %) | size (μm) | D50/ D10 | D90/ D50 | D90/ D10 | aspect ratio | 60° C. | 45° C. |
| 1 | Li(Ni$_{0.5}$Co$_{0.2}$Mn$_{0.3}$)O$_2$ | 20 | 15 | 200 | 30 | 0.3 | 1.5 | 1.3 | 2.0 | 2.5 | 75 | 95 |
| 2 | Li(Ni$_{0.6}$Co$_{0.2}$Mn$_{0.2}$)O$_2$ | 20 | 15 | 200 | 30 | 0.3 | 1.5 | 1.3 | 2.0 | 2.5 | 78 | — |
| 3 | Li(Co$_{0.9}$Mn$_{0.1}$)O$_2$ | 90 | 15 | 200 | 30 | 0.3 | 1.5 | 1.3 | 2.0 | 2.5 | 62 | |
| 4 | Li(Co$_{0.9}$Al$_{0.1}$)O$_2$ | 90 | 15 | 200 | 30 | 0.3 | 1.5 | 1.3 | 2.0 | 2.5 | 65 | |
| 5 | Li(Co$_{0.9}$Ti$_{0.1}$)O$_2$ | 90 | 15 | 200 | 30 | 0.3 | 1.5 | 1.3 | 2.0 | 2.5 | 66 | |
| 6 | Li(Co$_{0.9}$Mg$_{0.1}$)O$_2$ | 90 | 15 | 200 | 30 | 0.3 | 1.5 | 1.3 | 2.0 | 2.5 | 65 | |
| 7 | Li(Ni$_{0.5}$Co$_{0.2}$Mn$_{0.3}$)O$_2$ | 20 | 15 | 50 | 30 | 0.3 | 1.5 | 1.3 | 2.0 | 2.5 | 75 | |
| 8 | Li(Ni$_{0.5}$Co$_{0.2}$Mn$_{0.3}$)O$_2$ | 20 | 15 | 400 | 30 | 0.3 | 1.5 | 1.3 | 2.0 | 2.5 | 75 | |
| 9 | Li(Ni$_{0.5}$Co$_{0.2}$Mn$_{0.3}$)O$_2$ | 20 | 15 | 200 | 55 | 0.3 | 1.5 | 1.3 | 2.0 | 2.5 | 60 | |
| 10 | Li(Ni$_{0.5}$Co$_{0.2}$Mn$_{0.3}$)O$_2$ | 20 | 15 | 200 | 10 | 0.3 | 1.5 | 1.3 | 2.0 | 2.5 | 85 | |
| 11 | Li(Ni$_{0.5}$Co$_{0.2}$Mn$_{0.3}$)O$_2$ | 20 | 15 | 200 | 30 | 0.07 | 3.5 | 2.9 | 10.0 | 2.5 | 68 | |
| 12 | Li(Ni$_{0.5}$Co$_{0.2}$Mn$_{0.3}$)O$_2$ | 20 | 15 | 200 | 30 | 5 | 1.4 | 1.4 | 1.8 | 2.5 | 80 | |
| 13 | Li(Ni$_{0.5}$Co$_{0.2}$Mn$_{0.3}$)O$_2$ | 20 | 15 | 200 | 30 | 0.3 | 1.1 | 1.1 | 1.2 | 2.5 | 70 | |
| 14 | Li(Ni$_{0.5}$Co$_{0.2}$Mn$_{0.3}$)O$_2$ | 20 | 15 | 200 | 30 | 0.3 | 7.1 | 7.0 | 50.0 | 2.5 | 70 | |
| 15 | Li(Ni$_{0.5}$Co$_{0.2}$Mn$_{0.3}$)O$_2$ | 20 | 15 | 200 | 30 | 0.3 | 1.5 | 1.3 | 2.0 | 1.5 | 70 | |
| 16 | Li(Ni$_{0.5}$Co$_{0.2}$Mn$_{0.3}$)O$_2$ | 20 | 15 | 200 | 30 | 0.3 | 1.5 | 1.3 | 2.0 | 15 | 70 | |
| 17* | Li(Ni$_{0.5}$Co$_{0.2}$Mn$_{0.3}$)O$_2$ | 20 | Random | 200 | 30 | 0.3 | 1.5 | 1.3 | 2.0 | 1.1 | 50 | 80 |

Symbol *represents Comparative Example.

What is claimed is:

1. A lithium secondary battery comprising: a positive electrode plate that is a lithium complex oxide sintered plate with a thickness of 50 μm or more; a negative electrode plate; a separator interposed between the positive electrode plate and the negative electrode plate; and an electrolytic solution,
   wherein the lithium complex oxide sintered plate has a structure in which a plurality of primary grains having a layered rock-salt structure are bonded,
   wherein the lithium complex oxide has a composition represented by $Li_x(Co_{1-y}M_y)O_{2\pm\delta}$, wherein $1.0 \leq x \leq 1.1$, $0 < y \leq 0.8$, and $0 \leq \delta < 1$ are satisfied, and M is at least one selected from the group consisting of Mg, Ni, Al, Ti, and Mn, and
   wherein the plurality of primary grains have a mean tilt angle of over 0° and 30° or less, the mean tilt angle being a mean value of angles defined by (003) planes of the plurality of primary grains and a main plate face of the lithium complex oxide sintered plate,
   wherein the main plate face is a plate face of the lithium complex oxide sintered plate that is perpendicular to a thickness direction of the lithium complex oxide sintered plate, and
   wherein the lithium complex oxide sintered plate has a mean pore aspect ratio of 1.5 to 15.

2. The lithium secondary battery according to claim 1, wherein $0.01 \leq y \leq 0.8$ is satisfied.

3. The lithium secondary battery according to claim 1, wherein the lithium complex oxide sintered plate has a thickness of 50 to 500 μm.

4. The lithium secondary battery according to claim 3, wherein the lithium complex oxide sintered plate has a thickness of 90 to 400 μm.

5. The lithium secondary battery according to claim 1, wherein the lithium complex oxide sintered plate has a porosity of 10 to 55%.

6. The lithium secondary battery according to claim 1, wherein the lithium complex oxide sintered plate has a mean pore size of 0.07 to 5 μm.

7. The lithium secondary battery according to claim 1, wherein the lithium complex oxide sintered plate has volume-based D10, D50, and D90 pore sizes satisfying the relationships of:

$$1.1 \leq D50/D10 \leq 7.1,$$

$$1.1 \leq D90/D50 \leq 7.0, \text{ and}$$

$$1.2 \leq D90/D10 \leq 50.0.$$

* * * * *